United States Patent
Watanabe (10) Patent No.: US 12,283,294 B1
(45) Date of Patent: Apr. 22, 2025

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Toru Watanabe, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/600,867

(22) Filed: Mar. 11, 2024

(30) Foreign Application Priority Data

Dec. 22, 2023 (JP) .................................. 2023-216591

(51) Int. Cl.
    *G11B 5/54* (2006.01)
    *G11B 5/187* (2006.01)
    *G11B 5/55* (2006.01)
    *G11B 33/14* (2006.01)

(52) U.S. Cl.
    CPC .......... *G11B 5/5565* (2013.01); *G11B 5/1871* (2013.01); *G11B 2220/2516* (2013.01)

(58) Field of Classification Search
    CPC ....... G11B 5/54; G11B 33/14; G11B 33/1406; G11B 33/1446; G11B 33/148; G11B 33/08; G11B 17/32
    USPC .................................. 360/75, 97.13, 97.19
See application file for complete search history.

(56) References Cited

U.S. PATENT DOCUMENTS

| | | | |
|---|---|---|---|
| 5,729,399 A | 3/1998 | Albrecht et al. | |
| 8,064,156 B1 * | 11/2011 | Suzuki | G11B 5/743 360/75 |
| 2005/0002291 A1 | 1/2005 | Takeuchi | |

FOREIGN PATENT DOCUMENTS

| | | |
|---|---|---|
| JP | S62-245580 A | 10/1987 |
| JP | 2003-85899 A | 3/2003 |
| JP | 2005-25852 A | 1/2005 |

* cited by examiner

*Primary Examiner* — Nabil Z Hindi
(74) *Attorney, Agent, or Firm* — Kim & Stewart LLP (57) ABSTRACT

According to one embodiment, a magnetic disk device includes a magnetic disk and a magnetic head. The magnetic disk includes a data area on/from which data can be recorded/reproduced. The magnetic head records data on the data area and reproduces data from the data area. An outer edge of the data area includes first outer edge, second outer edge positioned on the further inner circumferential side of the magnetic disk relatively to the first outer edge, and third outer edges each connecting between the first outer edge and the second outer edge. The outer edge of the data area incudes concave parts made inwardly concave toward the inner circumferential side of the magnetic disk at not less than part thereof.

6 Claims, 11 Drawing Sheets

MAGNETIC DISK DEVICE

CROSS-REFERENCE TO RELATED APPLICATIONS

This application is based upon and claims the benefit of priority from Japanese Patent Application No. 2023-216591, filed Dec. 22, 2023, the entire contents of which are incorporated herein by reference.

FIELD

Embodiments described herein relate generally to a magnetic disk device.

BACKGROUND

On the surface of a magnetic disk serving as a recording medium to be used for a magnetic disk device, unevenness occurring in the manufacturing process thereof exists. When a slider of a magnetic head passes through such an uneven part, an off-track vibration becomes liable to occur on the slider. The off-track vibration is a vibration in the off-track direction, and causes a positioning error of the magnetic head relative to the track of the magnetic disk. The off-track direction is a direction parallel to the surface of the magnetic disk and perpendicular to the track of the magnetic disk and is, in simpler terms, the radial direction of the magnetic disk. The amplitude of the off-track vibration varies according to the temperature (atmospheric temperature) of the environment in which the magnetic disk device is used, and hence there is sometimes a case where the amplitude becomes greater than expected. In a state where the amplitude of the off-track vibration is large, a track adjacent to the track of the write object is adversely interfered, and there is a possibility of data being written to the adjacent track. Accordingly, when the amplitude of the off-track vibration becomes large, there is no other choice but to inhibit recording onto the objective track (write inhibit of data).

Accordingly, in order to improve the recording density and reliability of the magnetic disk device, it is necessary to set an area (hereinafter referred to as a data area) usable for recording/reproduction of data in the magnetic disk in consideration of the variations in the amplitude of the off-track vibration relative to the variations in the atmospheric temperature.

Embodiments described herein aim to provide a magnetic disk device capable of appropriately setting a data area of a magnetic disk in consideration of variations in the amplitude of an off-track vibration relative to variations in the atmospheric temperature.

DETAILED DESCRIPTION

In general, according to one embodiment, a magnetic disk device comprises a magnetic disk and a magnetic head. The magnetic disk includes a data area on/from which data can be recorded/reproduced. The magnetic head records data on the data area and reproduces data from the data area. An outer edge of the data area includes first outer edge, second outer edge positioned on the further inner circumferential side of the magnetic disk relatively to the first outer edge, and third outer edges each connecting between the first outer edge and the second outer edge. The outer edge of the data area incudes concave parts made inwardly concave toward the inner circumferential side of the magnetic disk at not less than part thereof.

Hereinafter, a magnetic disk device according to an embodiment will be described with reference to FIGS. 1 to 11.

Figure 1:
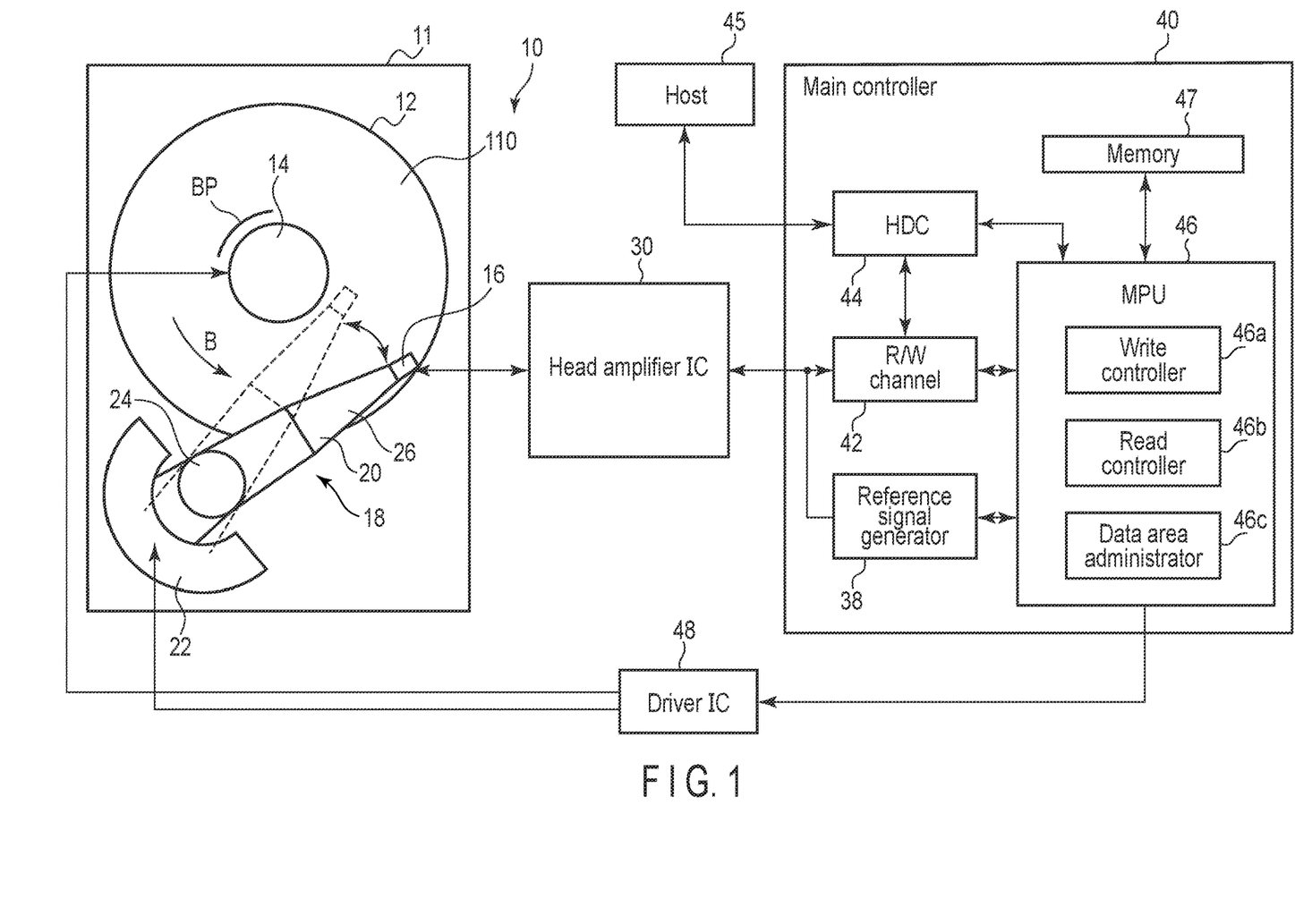
FIG. 1 is a block diagram showing the schematic configuration of a magnetic disk device (HDD) according to an embodiment.

FIG. 1 is a block diagram showing the schematic configuration of a hard disk drive (hereinafter referred to as the HDD) 10 according to the embodiment. The HDD 10 is an example of the magnetic disk device.

As shown in FIG. 1, the HDD 10 includes a rectangular parallelepiped-shaped housing 11, magnetic disk 12 serving as a recording medium accommodated in the housing 11, spindle motor 14 configured to support thereon and rotate the magnetic disk 12, and magnetic head 16 configured to carry out recording (write)/reproduction (read) of data on (to)/from the magnetic disk 12 (more specifically, data area 110 to be described later). The number of each of the magnetic disk 12 and magnetic head 16 is not limited to one, and may be plural. The housing 11 includes, for example, a rectangular parallelepiped-shaped box-like base (illustration omitted) opened at an upper part thereof, and cover (illustration omitted) to be put on the opening of the base.

The HDD 10 includes a head actuator 18 configured to move the magnetic head 16 to a position on a desired track of the magnetic disk 12 and carry out positioning of the magnetic head 16. The head actuator 18 includes a carriage assembly 20 configured to movably support the magnetic head 16 thereon, and voice coil motor (hereinafter referred to as a VCM) 22 configured to swing the carriage assembly 20.

The HDD 10 includes a controller including a head amplifier IC 30 configured to drive the magnetic head 16, main controller 40, and driver IC 48. The head amplifier IC 30 is provided on, for example, the carriage assembly 20 and is electrically connected to the magnetic head 16. The head amplifier IC 30 includes a write driver and read amplifier. The write driver outputs a recording (write) current corresponding to a signal output from an R/W channel 42 to the magnetic head 16. The read amplifier amplifies a reproduced (read) signal read from the magnetic disk 12 and outputs the amplified read signal to the main controller 40 (more specifically, R/W channel 42 to be described later).

The main controller 40 and driver IC 48 are configured on, for example, a control circuit board (illustration omitted) provided on the back surface side of the housing 11. The main controller 40 includes an R/W channel 42, hard disk controller (hereinafter referred to as an HDC) 44, microprocessor (hereinafter referred to as an MPU) 46, memory 47, and the like. The main controller 40 is electrically connected to the magnetic head 16 through the head amplifier IC 30. The main controller 40 is electrically connected to the VCM 22 and spindle motor 14 through the driver IC 48. The HDC 44 is connectable to a host 45.

In the memory 47 of the main controller 40, data area information is stored. The data area is an area on/from which predetermined data is recorded/reproduced in the magnetic disk 12. The data area 110 includes a user data area which can be utilized by the user and system data area necessary for system administration. Hereinafter, the circumferential direction of the magnetic disk 12 is referred to as the track direction and radial direction of the magnetic disk 12, i.e., the direction parallel to the magnetic disk 12 and perpendicular to the track direction is referred to as the off-track direction.

The data area information is information concerning the data area 110 of the magnetic disk 12 and is an aggregate of information including, for example, information on the holder-affected part present on the surface of the magnetic disk 12 to be described later, information indicating an outer edge position of the data area 110 of the magnetic disk 12, information indicating whether or not a sector of the magnetic disk 12 is to be permitted to undergo recording/reproduction of data, and the like. These pieces of information are acquired in, for example, the quality inspection of the magnetic disk 12 to be carried out before shipment of the product (HDD 10). Details of the data area information, acquisition and administration thereof, and the like will be described later.

In the main controller 40, for example, the MPU 46 includes a write controller 46a configured to control a recording (write) head, read controller 46b configured to control a reproducing (read) head, and data area administrator 46c configured to administer the data area. The MPU 46 executes processing of, for example, write controller 46a, read controller 46b, and data area administrator 46c on the firmware. It should be noted that the MPU 46 may include the write controller 46a, read controller 46b, and data area administrator 46c as circuits.

According to a command from the host 45, the write controller 46a controls recording (write) processing of data on (to) the magnetic disk 12, and read controller 46b controls reproduction (read) processing of data from the magnetic disk 12. The write controller 46a and read controller 46b each control the VCM 22 through the driver IC 48 to thereby position (seek) the magnetic head (recording head and reproducing head) 16 to a target position on the magnetic disk 12.

The data area administrator 46c administers the data area 110 of the magnetic disk 12. In this embodiment, the data area administrator 46c carries out LBA assignment processing to the data area 110 on the basis of a recording/reproduction permission/prohibition table as will be described later.

Figure 2:
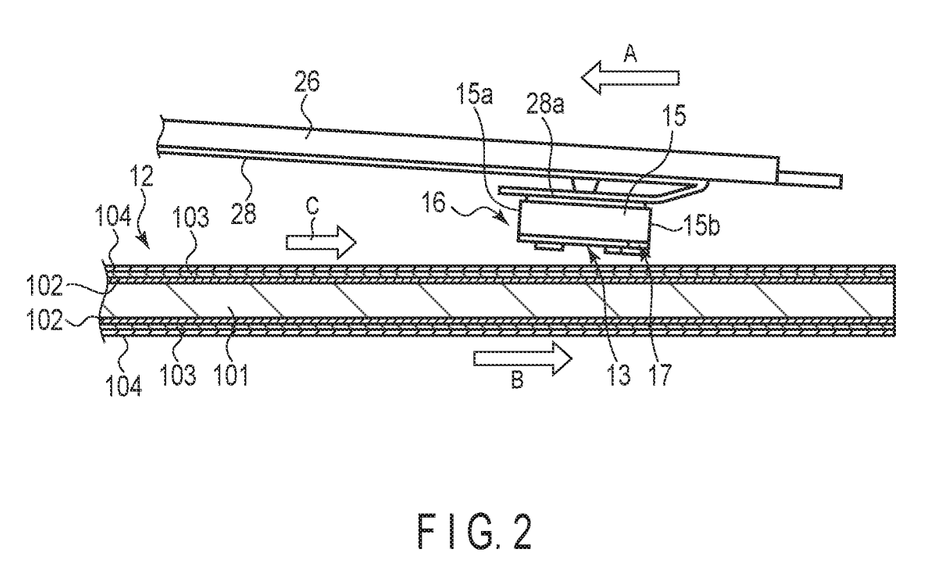
FIG. 2 is a view schematically showing a magnetic disk according to the embodiment and magnetic head in a state where the magnetic head is flying on the magnetic disk viewed from the side.

FIG. 2 is a view schematically showing the magnetic disk 12 and magnetic head 16 in a state where the magnetic head 16 is flying on the magnetic disk 12 viewed from the side.

As shown in FIG. 1 and FIG. 2, the magnetic disk 12 is configured as a perpendicular magnetic recording medium. The magnetic disk 12 includes a substrate 101 comprised of a nonmagnetic material formed into a discoid shape having a diameter of, for example, 96 mm (about 3.5 inches).

On each surface of the substrate 101, a soft magnetic material layer 102 serving as a foundation layer comprised of a material exhibiting a soft magnetic property, perpendicular magnetic recording layer 103 having magnetic anisotropy in the direction perpendicular to the surface of the magnetic disk 12, and protection film 104 are stacked on top of each other in layers from the lowermost layer to the uppermost layer in the order mentioned. The data area 110 of the magnetic disk 12 is configured to include the soft magnetic material layer 102, perpendicular magnetic recording layer 103, and protection film 104 stacked on the surface of the substrate 101.

It should be noted that the data area 110 of the magnetic disk 12 may be provided on only one surface of the substrate 101. A plurality of magnetic disks 12 are fitted onto a hub of the spindle motor 14 coaxially with each other. These magnetic disks 12 are rotated at a predetermined rotational speed by the spindle motor 14 in a predetermined direction (direction indicated by an arrow B).

The carriage assembly 20 includes a bearing unit 24 rotatably supported on the housing 11 and a plurality of arms (suspensions) 26 extending from the bearing unit 24. As shown in FIG. 2, the magnetic head 16 is supported on an extension end of each of the arms 26. The magnetic head 16 is electrically connected to the head amplifier IC 30 through a wiring member (flexure) 28 provided on the carriage assembly 20.

As shown in FIG. 2, the magnetic head 16 is configured as a flyable-type head and includes a slider 15 formed into approximately a parallelepiped-like shape, and head unit 17 formed on the slider 15. The slider 15 is formed of, for example, a sintered body (Altic) of alumina and titanium carbide, and head unit 17 is formed of a thin film of a plurality of layers. The slider 15 is attached to a gimbal unit 28a of the wiring member 28.

The slider 15 includes a disk-opposed surface (airborne surface (hereinafter referred to as an ABS)) 13 having approximately a rectangular shape opposed to the surface of the magnetic disk 12. The slider 15 is maintained in a state where the slider 15 is flied from the surface of the magnetic disk 12 by a predetermined amount by means of an airflow C occurring between the disk surface and ABS 13 due to the rotation of the magnetic disk 12. The direction (direction indicated by an arrow C) of the airflow C is coincident with the rotational direction B of the magnetic disk 12. The slider 15 includes a leading end 15a positioned on the inflow side of the airflow C and trailing end 15b positioned on the outflow side of the airflow C. The head unit 17 is formed on the trailing end 15b of the slider 15. Concomitantly with the rotation of the magnetic disk 12, the magnetic head 16 travels in the direction (head traveling direction) indicated by an arrow A relatively to the magnetic disk 12, i.e., in the direction opposite to the rotational direction B of the magnetic disk 12.

Next, administration of the data area information of the magnetic disk 12 in this embodiment will be described below. As a premise, general characteristics of the magnetic disk 12 will first be described.

Figure 3:
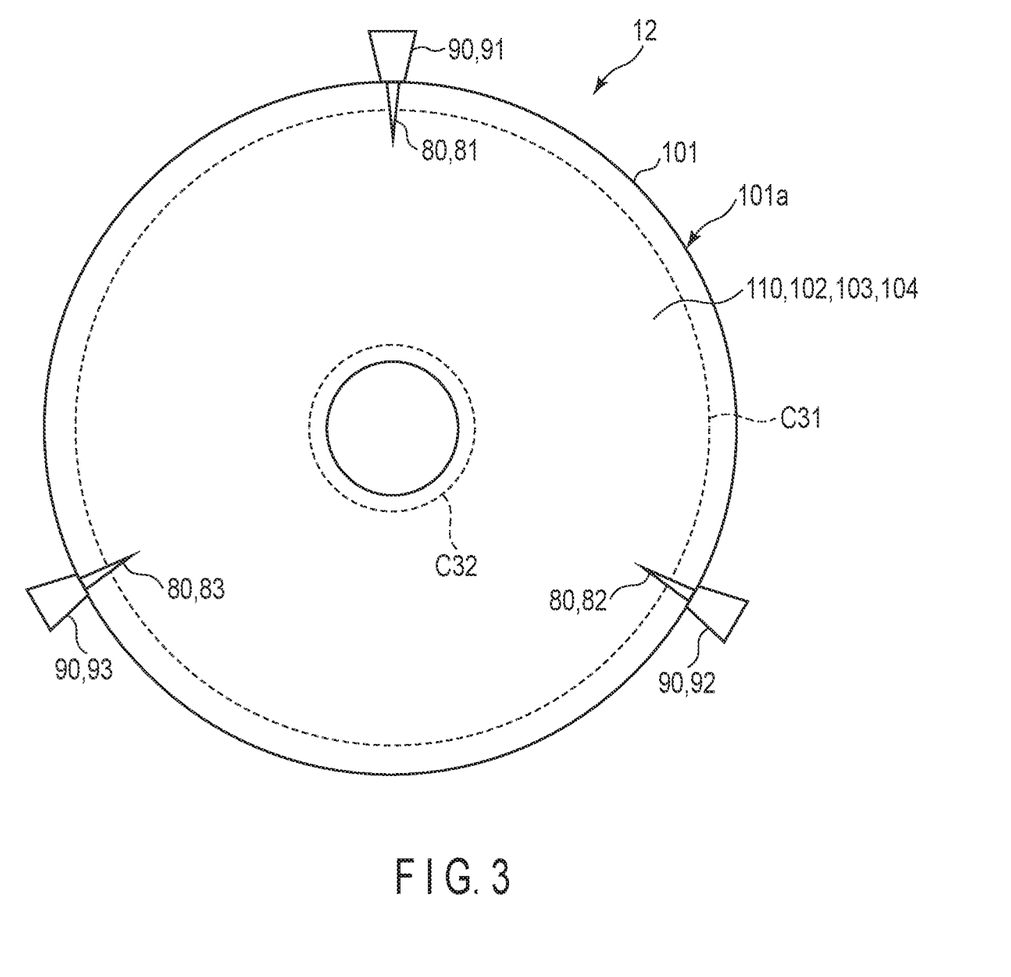
FIG. 3 is a plan view for explaining a process of forming a film on the surface of a substrate of the magnetic disk of the magnetic disk device (HDD) according to the embodiment.

FIG. 3 is a plan view for explaining a process of forming the soft magnetic material layer 102, perpendicular magnetic recording layer 103, and protection film 104 on the surface of the annular substrate 101 of the magnetic disk 12. The data area 110 of the magnetic disk 12 is configured to include the soft magnetic material layer 102, perpendicular magnetic recording layer 103, and protection film 104 stacked on the surface of the substrate 101.

As shown in FIG. 3, on the magnetic disk 12, the data area 110 is arranged inside the outermost circumferential radial position (hereinafter referred to as a flyability-assured area outermost circumference) of flyability-assured area of the magnetic head 16. The flyability-assured area of the magnetic head 16 is an area in which the magnetic head 16 is physically enabled to fly on the disk surface of the magnetic disk 12 and record/reproduce data on/from the data area 110.

In the example shown in FIG. 3, an area between a broken line C31 and broken line C32 is the flyability-assured area. The broken line C31 indicates the flyability-assured area outermost circumference, and broken line C32 indicates a flyability-assured area innermost circumference (innermost circumferential radial position of the flyability-assured area). In order to efficiently increase the recording capacity of the HDD 10, it is sufficient if the flyability-assured area outermost circumference C31 is made closer to the outer edge of the magnetic disk 12 to the utmost extent possible, thereby making the data area 110 as large as possible.

Figure 4:
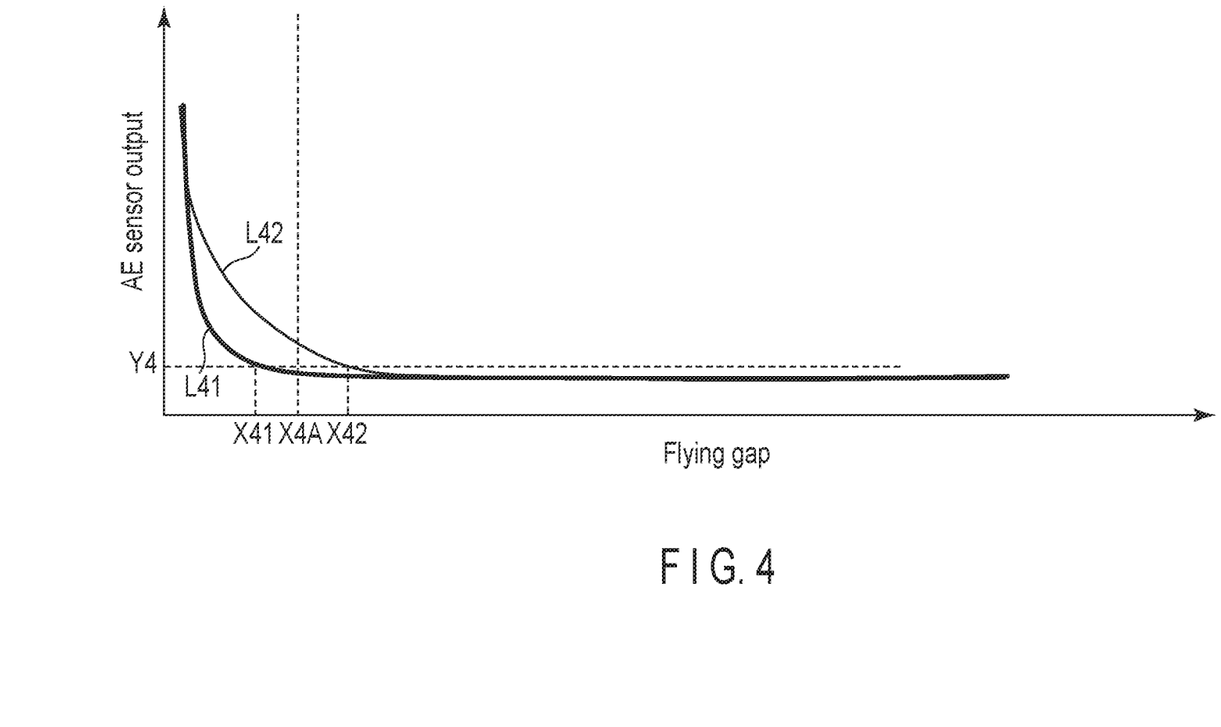
FIG. 4 is a view showing the degree of flyability of the magnetic head by a comparison between the degree of flyability in a flyability-assured area of the magnetic head and that out of the aforementioned area in the magnetic disk device (HDD) according to the embodiment.

FIG. 4 is a view showing the degree of flyability of the magnetic head by a comparison between the degree of flyability in the flyability-assured area of the magnetic head and that out of the aforementioned area. In FIG. 4, the transverse axis indicates a gap (flying gap) between the disk surface of the magnetic disk and magnetic head (for example, the ABS of the slider), and vertical axis indicates an output value of an acoustic emission (AE) sensor. The AE sensor is a contact sensor provided on the slider or the like of the magnetic head of the testing machine of the HDD, detects contact between the disk surface and magnetic head and, the harder the contact between the disk surface and magnetic head, the greater the sensing output thereof becomes. Therefore, according to the sensing output of the AE sensor, it is possible to determine to what degree of the gap, the slider of the magnetic head can fly relatively to the disk surface. That is, if it is known that with what degree of the flying gap, the slider of the magnetic head carries out recording/reproduction on/from the magnetic disk, it is possible to determine the flyability-assured area of the magnetic head.

In FIG. 4, a thick line L41 indicates a locus of the flying state of the magnetic head in the flyability-assured area, and thin line L42 indicates a locus of the flying state of the aforementioned magnetic head outside the flyability-assured area. As indicated by the thin line L42 in FIG. 4, when the gap between the disk surface and magnetic head becomes less than X42 outside the flyability-assured area, the sensing output of the AE sensor abruptly rises. Conversely, as indicated by the thick line L41 in FIG. 4, when the gap between the disk surface and magnetic head becomes less than X41 which is less than X42 within the flyability-assured area, the sensing output of the AE sensor abruptly rises. A symbol Y4 is a permissible value of the sensing output of the AE sensor from a viewpoint of flyability assurance of the magnetic head and, in the example shown in FIG. 4, corresponds to the value of the sensing output of the AE sensor at each of the gaps X41 and X42.

As described above, in the example shown in FIG. 4, the value of a gap X4A less than the gap X42 and greater than the gap X41 is set as such a flyability-assured value of the magnetic head. In other words, when the sensing output of the AE sensor abruptly rises at the gap X4A which is the flyability-assured value, it becomes possible to presume that, for example, the area of the disk surface inside the position of the magnetic head at that time is within the flyability-assured area.

As shown in FIG. 2 and FIG. 3, the magnetic disk 12 is configured by providing a plurality of layers (three layers in the example shown in FIG. 2 and FIG. 3) of films on the surface of the substrate 101. At the time of film formation of these films, it is necessary to hold the aforementioned substrate 101 in order to appropriately keep the attitude of the substrate 101. In the example of a film formation process shown in FIG. 3, the substrate 101 is held by holders 90. The holders 90 abut on the outer circumferential surface 101a of the substrate 101 to thereby press the aforementioned outer circumferential surface 101a in the off-track direction. The number of the holders 90 holding the substrate 101 is not particularly limited. In the example shown in FIG. 3, the attitude of the substrate 101 is held by the three holders 91, 92, and 93.

When the substrate 101 is held by the holders 90, each part of the substrate 101 at which the substrate 101 is held at the time of film formation on the aforementioned substrate 101 comes to have a thickness different from other parts which are not held. That is, in the magnetic disk 12, at each part at which the substrate 101 is held by the holder 90, a portion (hereinafter referred to as the holder-affected part) 80 different from the other parts which are not held in the thickness (film thickness) of the film (for example, perpendicular magnetic recording layer 103) is formed. Accordingly, the thickness of the film formed on the substrate 101 is not uniform and becomes uneven.

In the example shown in FIG. 3, in the magnetic disk 12, at the parts held by the three holders 91, 92, and 93, three holder-affected parts 81, 82, and 83 are respectively present. These holder-affected parts 81, 82, and 83 each extend from the outer circumferential surface 101a pressed by the holders 91, 92, and 93 in the off-track direction. Each of the holder-affected parts 81, 82, and 83 of the example shown in FIG. 3 has a triangular shape the width of which gradually becomes less toward the inside (center of the magnetic disk 12) in the off-track direction. However, the planar shape of each of the holder-affected parts 81, 82, and 83 is not limited to such a triangular shape. Further, although the planar shapes of the holder-affected parts 81, 82, and 83 are illustrated on the assumption that they are identical to each other for the sake of convenience, their actual planar shapes are not identical to each other.

Figure 5:
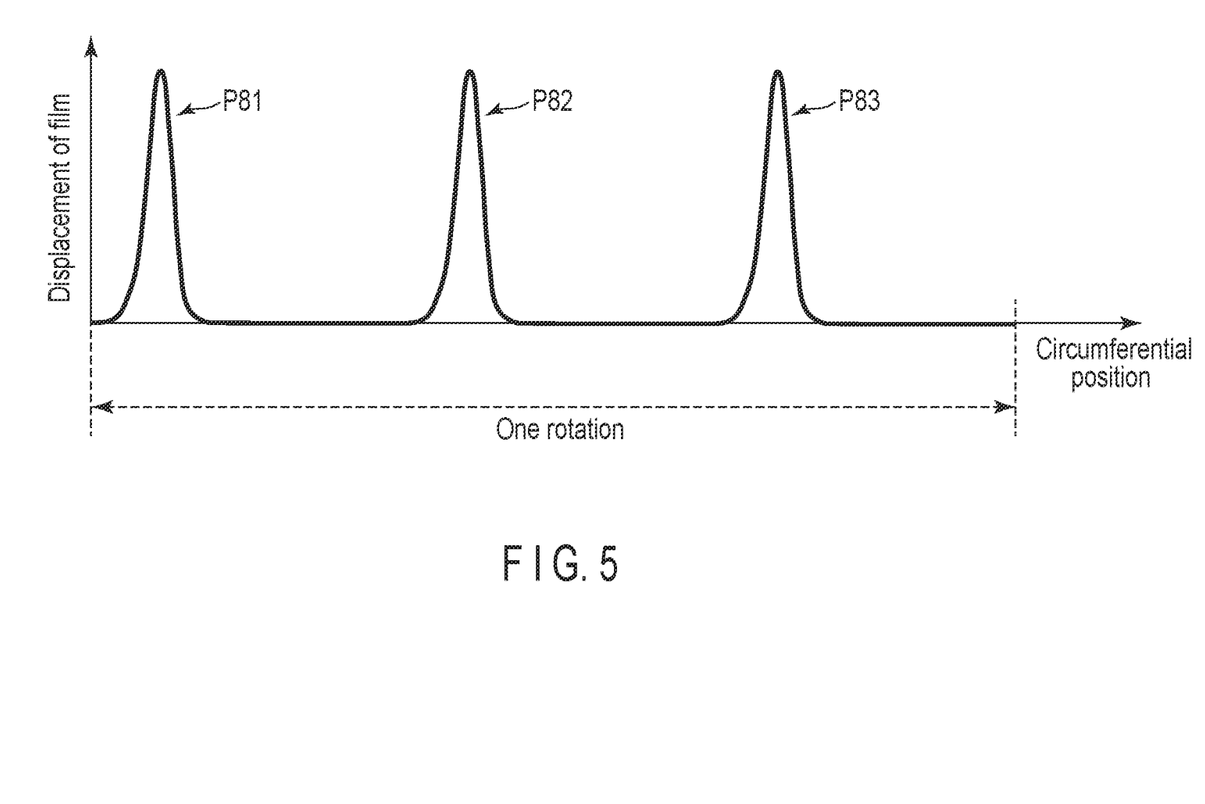
FIG. 5 is a view showing displacement (variation in the film thickness) of a film formed on the substrate of the magnetic disk on which holder-affected parts exist in the magnetic disk device (HDD) according to the embodiment.

FIG. 5 is a view showing displacement (variation in the film thickness) of the film formed on the substrate 101 of the magnetic disk 12 on a track on which the holder-affected parts 81, 82, and 83 are present. In FIG. 5, the transverse axis indicates the circumferential position, and vertical axis indicates displacement of the film. The displacement of the film in this case is shown as a degree of variation in the thickness of a case where the film thickness at each of parts (hereinafter referred to as a normal area) at which the holder-affected parts 81, 82, and 83 are not present is assumed to be zero. In the example shown in FIG. 5, at each of the circumferential positions P81, P82, and P83 corresponding to the holder-affected parts 81, 82, and 83, the film thickness abruptly varies relatively to the normal area. As the displacement of the film, a case where the film thickness abruptly becomes less (thinner), i.e., a case where the holder-affected parts 81, 82, and 83 are concave parts relatively to the normal area is assumed. However, there is also a case where the film thickness abruptly becomes greater (thicker), i.e., a case where the holder-affected parts 81, 82, and 83 are convex parts relatively to the normal area.

As described above, at the holder-affected part 80, the film undergoes displacement (film thickness varies) relatively to the normal area. That is, the gap between the disk surface of the magnetic disk 12 and magnetic head 16 differs between the holder-affected part 80 and normal area. However, when a test concerning the flyability-assurance of the magnetic head as described with reference to FIG. 4 is carried out, there is sometimes a case where the sensing output of the AE sensor does not rise at the holder-affected part 80 and becomes lower than or equal to the permissible value. In this case, it can be erroneously determined that the holder-affected part 80 is the normal area, in other words, that the holder-affected part 80 is included in the appropriate flyability-assured area.

Figure 6:
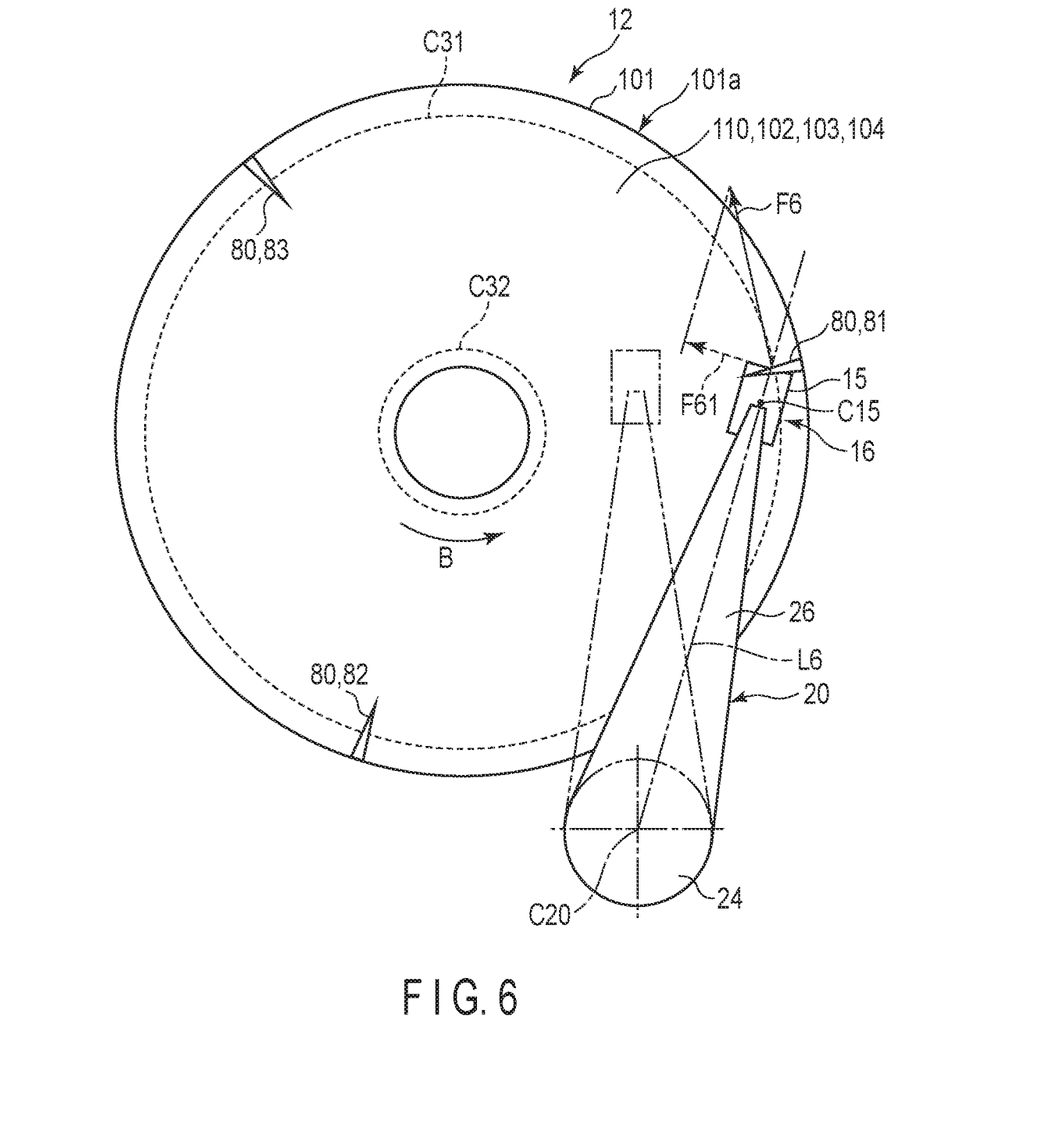
FIG. 6 is a plan view showing the state of shearing force occurring between the slider of the magnetic head and disk surface in the magnetic disk according to the embodiment.

On the other hand, when the slider 15 of the magnetic head 16 passes through a part above the disk surface of the rotating magnetic disk 12, shearing force acts between the aforementioned slider 15 and disk surface. FIG. 6 is a plan view for explaining the state of the shearing force occurring between the slider 15 and disk surface.

As shown by chain double-dashed lines in FIG. 6, for example, when the slider 15 of the magnetic head 16 is positioned at a part closer to the inner circumference of the magnetic disk 12, a state where the centerline of the arm 26 of the carriage assembly 20 is in the circumferential direction (rotational direction B) of the aforementioned magnetic disk 12 is brought about. At this time, between the slider 15 passing through the part above the disk surface of the magnetic disk 12 and the aforementioned disk surface, shearing force acts in the direction along the centerline of the arm 26. The centerline of the arm 26 is a virtual line (dashed-dotted line L6 shown in FIG. 6) connecting between the rotational center C20 of the bearing unit 24 of the carriage assembly 20 and center C15 of the slider 15.

Conversely, as shown by solid lines in FIG. 6, for example, when the slider 15 of the magnetic head 16 is positioned at a part closer to the outer circumference of the magnetic disk 12, the centerline L6 of the arm 26 is brought into a state where the centerline L6 is inclined relatively to the circumferential direction (rotational direction B) of the aforementioned magnetic disk 12 by a predetermined angular degree at the position of the slider 15 passing through the part above the disk surface of the rotating magnetic disk 12. At this time, between the slider 15 passing through the part above the disk surface of the rotating magnetic disk 12 and aforementioned disk surface, shearing force as shown by a solid line arrow F6 in FIG. 6 acts.

The shearing force F6 described above includes a component (component indicated by a broken line arrow F61 in FIG. 6, hereinafter referred to as component force F61) in a direction in which the component crosses the track of the magnetic disk 12 relatively to the arm 26. By the function of the aforementioned component force F61, the arm 26 of the carriage assembly 20, in short, the slider 15 of the magnetic head 16 vibrates in the off-track direction. Hereinafter, such a vibration is referred to as an off-track vibration. When the slider 15 passes through a part above the holder-affected part 80, the gap between the magnetic head 16 and disk surface varies, and hence the shearing force acting between these members varies. Accordingly, when the slider 15 passes through the part above the holder-affected part 80, the amplitude of the off-track vibration also varies.

Figure 7:
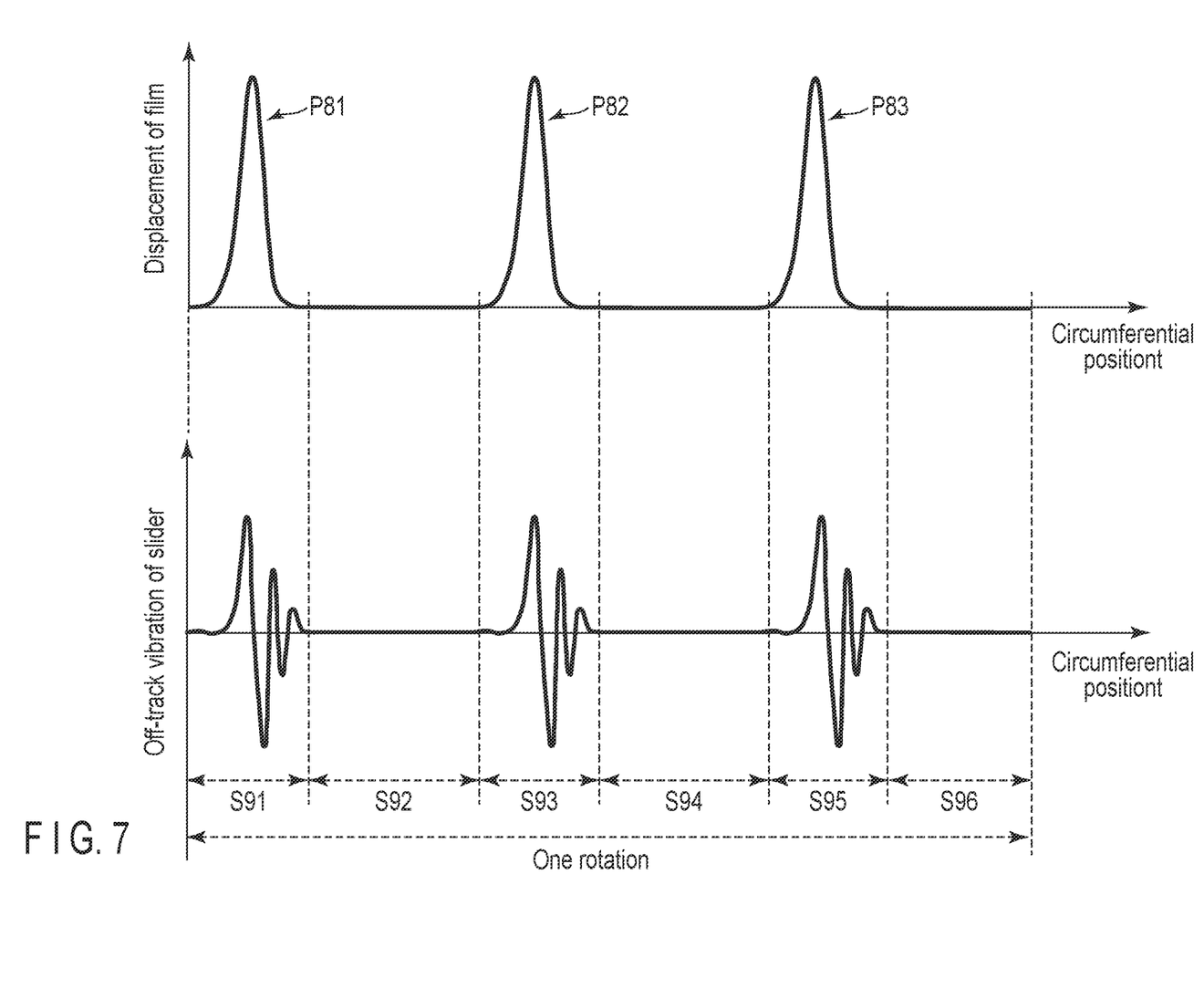
FIG. 7 is a view showing the state of an off-track vibration occurring on the slider of the magnetic head in the magnetic disk device (HDD) according to the embodiment.

FIG. 7 is a view showing the state of the off-track vibration occurring on the slider 15 of the magnetic head 16. In FIG. 7, the state of the off-track vibration of the slider 15 corresponding to the displacement (variation in the film thickness) of the film of the substrate 101 is shown. Here, the state of the off-track vibration at the track of the magnetic disk 12 in which the holder-affected parts 81, 82, and 83 as shown in FIG. 5 are present is shown.

As shown in FIG. 7, the slider 15 off-track-vibrates in response to the abrupt variations in the film thickness at the circumferential positions P81, P82, and P83 relatively to the normal area. That is, in the areas other than the circumferential positions P81, P82, and P83 corresponding to the holder-affected parts 81, 82, and 83, i.e., within the normal area ranges S92, S94, and S96, the off-track vibration is almost hardly caused. Conversely, within the ranges S91, S93, and S95 of the circumferential positions P81, P82, and P83 corresponding to the holder-affected parts 81, 82, and 83, the off-track vibration is caused. In other words, at the holder-affected parts 81, 82, and 83, the amplitude of the off-track vibration becomes greater than the normal areas. In the example shown in FIG. 7, the amplitude of the off-track vibration in the normal areas (S92, S94, and S96) is approximately zero.

As long as the amplitude of the off-track vibration remains within a permissible range, the occurrence itself of the aforementioned off-track vibration is not a particular problem. The off-track vibration, in short, the maximum amplitude of the off-track vibration is dependent on the temperature. The reason for this is that the damping material (vibration damping material) mounted on the support medium supporting thereon the slider 15 of the magnetic head 16 has temperature characteristics. The temperature in this case is the atmospheric temperature (environmental temperature) of the HDD 10. In general, when the atmospheric temperature turns to a low temperature, the damping performance lowers, and hence the amplitude of the off-track vibration becomes greater.

Figure 8:
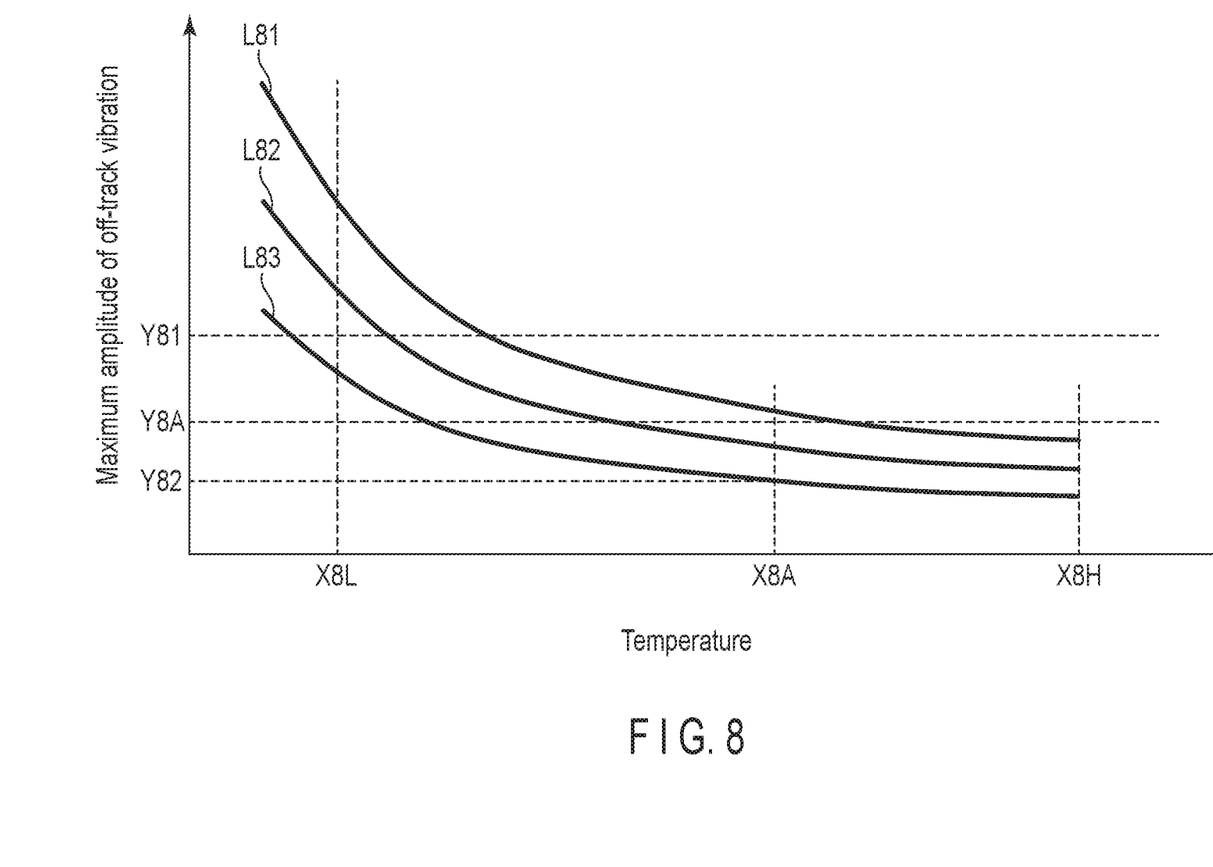
FIG. 8 is a view for explaining a relationship between the temperature and off-track vibration in a testing machine of the magnetic disk device (HDD) according to the embodiment.

FIG. 8 is a view showing a relationship between the temperature and off-track vibration in a testing machine of the HDD 10. In FIG. 8, the transverse axis indicates the temperature (atmospheric temperature) and vertical axis indicates the maximum amplitude of the off-track vibration. In such a testing machine, holder-affected parts 80 are present in the magnetic disk 12. In FIG. 8, the temperature characteristics of the maximum amplitude of the off-track vibration occurring on the slider 15 of the magnetic head 16 in the aforementioned testing machine of the HDD 10 are shown. Here, as an example, the temperature characteristics of the maximum amplitude of the off-track vibration occurring on the slider 15 of the aforementioned magnetic head 16 at the time when the magnetic head 16 carries out recording/reproduction on/from a predetermined track of the magnetic disk 12 mounted on the testing machine of the HDD 10 are shown. In FIG. 8, solid lines L81, L82, and L83 are each loci corresponding to the results of a case where temperature characteristics of the maximum amplitude of the off-track vibration occurring on the slider 15 of the magnetic head 16 described above are measured three times.

In FIG. 8, X8H is the highest operating temperature of the HDD 10, and X8L is the lowest operating temperature of the HDD 10. The highest operating temperature X8H is the highest temperature of the atmospheric temperature at which the operation of the HDD 10 is assumed and is, as an example, about 60° C. (hereinafter referred to as a high temperature). The lowest operating temperature X8L is the lowest temperature of the atmospheric temperature at which the operation of the HDD 10 is assumed and is, as an example, about 5° C. (hereinafter referred to as a low temperature). Conversely, X8A is the execution temperature (hereinafter referred to as a measurement temperature X8A) of the measurement test of the maximum amplitude of the off-track vibration, i.e., is the atmospheric temperature of the HDD 10 set at the time of the test, and is here the ordinary temperature (normal temperature) (about 30° C.). Such a test is executed when the outer edge position of the data area 110 in the HDD 10 to be described later is to be set.

In the temperature characteristics indicated by a solid line L81 and temperature characteristics indicated by a solid line L82 in FIG. 8, the maximum amplitude of the off-track vibration falls below the value of the permissible value (hereinafter referred to as a permissible off-track vibration amplitude) Y81 at each of the highest operating temperature X8H and measurement temperature X8A, i.e., at each of the high temperature time and ordinary temperature time. However, the maximum amplitude of the off-track vibration exceeds the value of the permissible off-track vibration amplitude Y81 at the lowest operating temperature X8L, i.e., at the low temperature time. That is, the maximum amplitude of the off-track vibration exceeds the value of the permissible off-track vibration amplitude Y81 at temperatures lower than the measurement temperature X8A and higher than the lowest operating temperature X8L.

Conversely, in the temperature characteristics indicated by the solid line L83 in FIG. 8, the maximum amplitude of the off-track vibration falls below the value of the permissible off-track vibration amplitude Y81 at the highest operating temperature X8H and at the measurement temperature X8A, i.e., at each of the high temperature time and ordinary temperature time. Furthermore, the maximum amplitude of the off-track vibration falls below the value of the permissible off-track vibration amplitude Y81 even at the lowest operating temperature X8L, i.e., even at the low temperature time. That is, in each of the cases of the high temperature time, ordinary temperature time, and low temperature time, the maximum amplitude of the off-track vibration remains within a range of the permissible off-track vibration amplitude Y81.

Accordingly, when the maximum amplitude of the off-track vibration at the measurement temperature X8A, i.e., at the ordinary temperature time is less than or equal to the value (hereinafter referred to as a permissible off-track vibration amplitude threshold) Y82 in the temperature characteristics indicated by the solid line L83, it can be presumed according to the temperature characteristics indicated by the solid line L83 that it is possible to restrict the maximum amplitude of the off-track vibration at the lowest operating temperature X8L, i.e., at the low temperature time to a value less than or equal to the permissible off-track vibration amplitude Y81.

It should be noted that in this case, when the maximum amplitude of the off-track vibration at the measurement temperature X8A, i.e., at the ordinary temperature time is less than or equal to the predetermined threshold Y8A, it can be more securely presumed that it is possible to restrict the maximum amplitude of the off-track vibration at the lowest operating temperature X8L, i.e., at the low temperature time to a value less than or equal to the permissible off-track vibration amplitude Y81. The predetermined threshold Y8A is a predetermined value less than the value of the permissible off-track vibration amplitude Y81 and greater than the permissible off-track vibration amplitude threshold Y82 and is, as an example, the permissible off-track vibration amplitude reference value Y9 to be described later.

Here, as shown in FIG. 3 and FIG. 6, the holder-affected part 80 extends from the outer circumferential surface 101a of the substrate 101 of the magnetic disk 12 toward the inside thereof in the off-track direction. Accordingly, the off-track vibration occurring on the slider 15 of the magnetic head 16 at the time when the slider 15 passes through a part above the holder-affected part 80 becomes less from the outer side toward the inner side in the off-track direction.

Accordingly, in this embodiment, the test is carried out by moving the slider 15 to such a radial position that the maximum amplitude of the off-track vibration becomes less than or equal to the permissible off-track vibration amplitude Y81, and evaluation is repetitively carried out. Thereby, it is possible to set the radial position of the magnetic disk 12 at which the maximum amplitude of the off-track vibration of the slider 15 becomes the permissible off-track vibration amplitude Y81.

Figure 9:
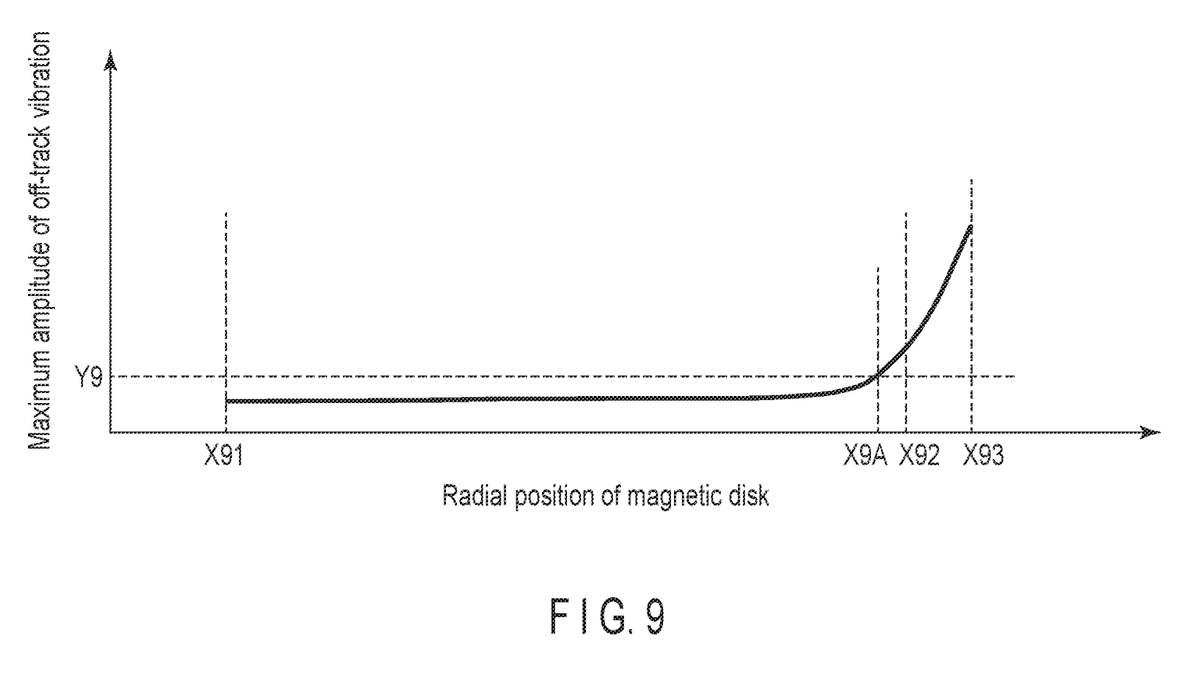
FIG. 9 is a view showing a relationship between the radial position of the magnetic disk and off-track vibration in the magnetic disk device (HDD) according to the embodiment.

FIG. 9 is a view showing a relationship between the radial position of the magnetic disk 12 and off-track vibration in the HDD 10. In FIG. 9, the transverse axis indicates the radial position of the magnetic disk 12, i.e., the distance from the rotational center of the magnetic disk 12 and vertical axis indicates the maximum amplitude of the off-track vibration. The symbol X91 indicates the innermost circumferential radial position (flyability-assured area innermost circumference) of the flyability-assured area of the magnetic head 16 configured to record/reproduce data on/from such a magnetic disk 12, and X92 indicates the outermost circumferential radial position (flyability-assured area outermost circumference) of the aforementioned flyability-assured area. Further, X93 indicates the outer edge position (position of the outer circumferential surface 101a of the substrate 101) of the aforementioned magnetic disk 12 (hereinafter referred also to as a disk outer edge part X93).

As shown in FIG. 9, in the HDD 10, although the maximum amplitude of the off-track vibration slightly rises from the flyability-assured area innermost circumference X91, the maximum amplitude thereof described above maintains approximately a constant value, and turns to an abrupt rise before reaching the flyability-assured area outermost circumference X92. Then, the maximum amplitude of the off-track vibration exceeds the predetermined threshold at the flyability-assured area outermost circumference X92, and further rises until arrival thereof at the outer edge position (disk outer edge part) X93. The predetermined threshold at this time is the permissible off-track vibration amplitude reference value Y9.

The permissible off-track vibration amplitude reference value Y9 is set on the basis of the permissible off-track vibration amplitude Y81 shown in FIG. 8. The permissible off-track vibration amplitude reference value Y9 is set to, for example, a value less than the value of the permissible off-track vibration amplitude Y81, as an example, a predetermined value (predetermined threshold Y8A shown in FIG. 8) less than the value of the permissible off-track vibration amplitude Y81 and greater than the permissible off-track vibration amplitude threshold Y82.

According to such setting, when the maximum amplitude of the off-track vibration at the measurement temperature X8A, i.e., at the ordinary temperature time is less than or equal to the permissible off-track vibration amplitude reference value Y9, it can be more securely presumed according to the example shown in FIG. 8 that it is possible to restrict the maximum amplitude of off-track vibration at the lowest operating temperature X8L, i.e., at the low temperature time to a value less than or equal to the permissible off-track vibration amplitude Y81.

Accordingly, in FIG. 9, the value X9A of the radial position of the magnetic disk 12 at the time when the maximum amplitude of the off-track vibration becomes the permissible off-track vibration amplitude reference value Y9 is set as the outer edge position of the data area 110. Thereby, at the radial position X9A of the data area 110, it is securely possible to restrict the maximum amplitude of the off-track vibration of the slider 15 of the magnetic head 16 to a value less than or equal to the permissible off-track vibration amplitude Y81.

In the example shown in FIG. 9, the occurrence main cause of the off-track vibration is the holder-affected part 80. Accordingly, in the areas of the magnetic disk 12 other than the holder-affected parts 80, the off-track vibration resulting from the aforementioned holder-affected parts 80 is restricted to the minimum, in short, the maximum amplitude thereof is restricted to a value less than or equal to the permissible off-track vibration amplitude Y81. Accordingly, in the data area 110, the area other than holder-affected parts 80 of the magnetic disk 12 is expanded up to the flyability-assured area outermost circumference X92. In other words, in the data area 110, the areas corresponding to the holder-affected parts 80 are narrowed to a position further inside the flyability-assured area outermost circumference X92.

Figure 10:
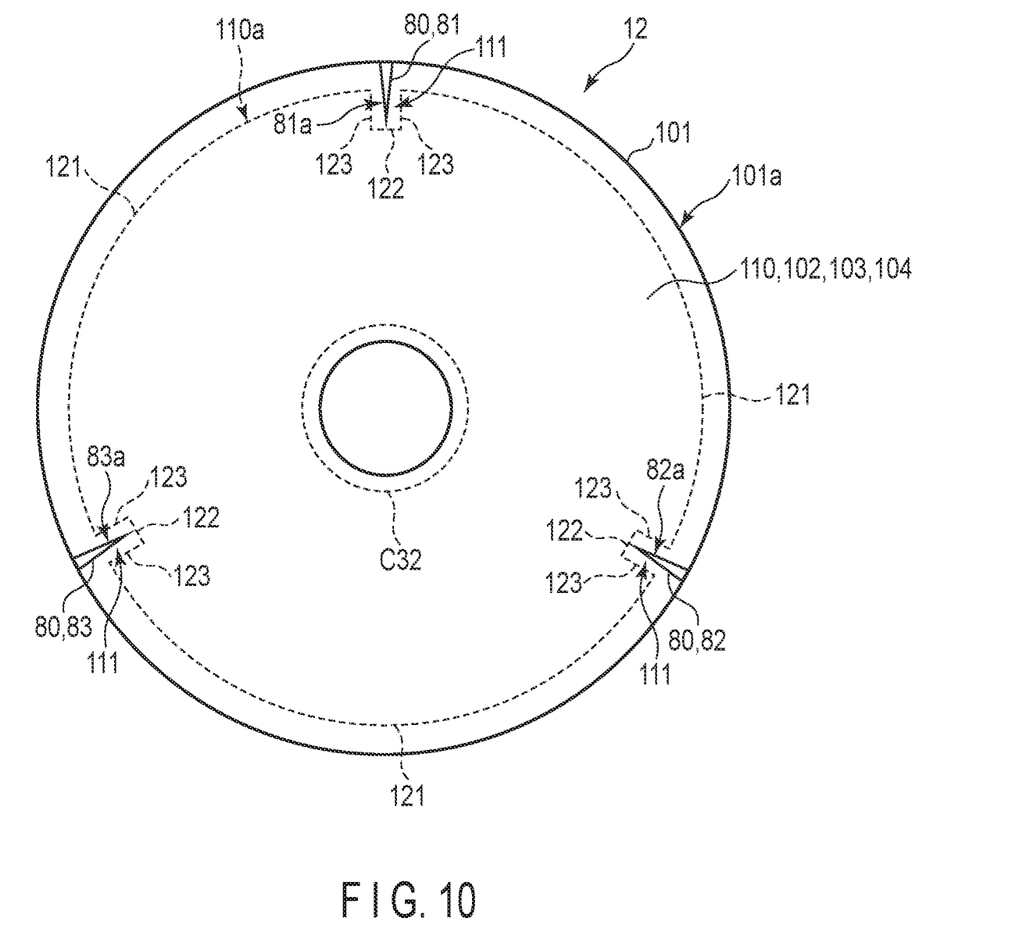
FIG. 10 is a plan view showing the state of a data area of the magnetic disk in the magnetic disk device (HDD) according to this embodiment.

FIG. 10 is a plan view showing the state of the data area 110 of the magnetic disk 12 in the HDD 10 according to this embodiment. In the example shown in FIG. 10, in the magnetic disk 12, three holder-affected parts 81, 82, and 83 are present. These three holder-affected parts 81, 82, and 83 extend from the disk outer edge part X93 toward the inside in the off-track direction to exceed the flyability-assured area outermost circumference X92. That is, the three holder-affected parts 81, 82, and 83 each have parts (hereinafter referred to as extension parts) 81a, 82a, and 83a positioned inside the flyability-assured area outermost circumference X92.

As shown in FIG. 10, an outer edge 110a of the data area 110 of the magnetic disk 12 detours (avoids) the extension parts 81a, 82a, and 83a of the holder-affected parts 81, 82, and 83 to get inside in the off-track direction. Regarding the outer edge 110a of the data area 110, each of parts (hereinafter referred to as first outer edges) 121 corresponding to the parts other than the extension parts 81a, 82a, and 83a is made (coincident with) the outermost circumferential radial position (flyability-assured area outermost circumference) of the flyability-assured area indicated by X92 in FIG. 9. The first outer edges 121 are continuous with each other in a circular arc-like shape concentric with the magnetic disk 12. Conversely, regarding the outer edge 110a of the data area 110, parts (hereinafter referred to as second outer edges) 122 corresponding to the extension parts 81a, 82a, and 83a are positioned on the further inner circumferential side of the magnetic disk relatively to the first outer edges 121. Each of the second outer edges 122 is made (coincident with) the radial position indicated by the symbol X9A in FIG. 9. Each part (hereinafter referred to as a third outer edge) 123 connecting between the first outer edge 121 and second outer edge 122 corresponds to the boundary between a sector in which the holder-affected part (81, 82 or 83) is present and sector in which the holder-affected part (81, 82 or 83) is not present, the sectors being to be described later. The outer edge 110a of the data area 110 includes at least two third outer edges. That is, the outer edge 110a of the data area 110 includes the first outer edges 121, second outer edges 122, and third outer edges 123.

As a result, the data area 110 is in a state where the data area 110 is decreased by being inwardly retracted (set back) from the first outer edge 121 (flyability-assured area outermost circumference X92) by an amount of each of the parts thereof each formed into approximately a rectangular concave shape and corresponding to the extension parts 81a, 82a, and 83a, in short, corresponding to the holder-affected parts 81, 82, and 83. That is, the data area 110 is in a state where the parts thereof corresponding to the parts other than the extension parts 81a, 82a, and 83a, in short, corresponding to the parts other than the holder-affected parts 81, 82, and 83 are extended from the second outer edges 122 to the first outer edges 121. In other words, concave parts 111 are defined at the outer edge 110a of the data area 110 by the first outer edges 121, second outer edges 122, and third outer edges 123. That is, the outer edge 110a includes concave parts 111 made inwardly concave toward the inner circumferential side at not less than part (three parts in the example shown in FIG. 10) thereof.

In the data area 110, the parts inwardly retracted (set back) from the first outer edge 121 (flyability-assured area outermost circumference X92) correspondingly to the holder-affected parts 81, 82, and 83, i.e., the concave parts 111 are prohibited from undergoing recording/reproduction of data. That is, the concave parts 111 are excluded from the data area 110. As described above, whether or not recording/reproduction of data is to be permitted (permission/prohibition) is set in units of sectors of a track in which holder-affected parts 81, 82, and 83 are present.

As described above, in the magnetic disk 12, the holder-affected parts 81, 82, and 83 are different from the parts other than the aforementioned parts 81, 82, and 83 in the film thickness (for example, thickness of the perpendicular magnetic recording layer 103). The concave parts 111 are arranged correspondingly to the holder-affected parts 81, 82, and 83, and are excluded from the data area 110. Accordingly, the film thickness of the perpendicular magnetic recording layer 103 of the concave part 111 is different from the film thickness of the perpendicular magnetic recording layer 103 of the data area 110.

Figure 11:
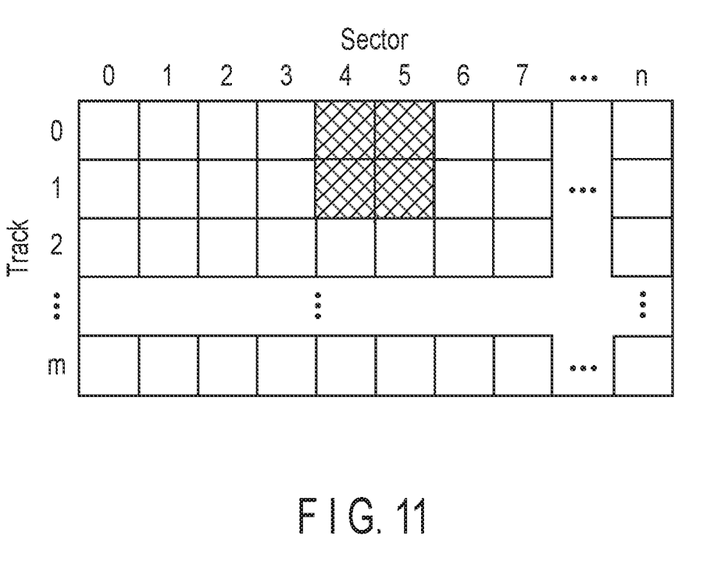
FIG. 11 is a view schematically showing an example of recording/reproduction permission/prohibition of data in each sector in each of a plurality of tracks of the magnetic disk in the magnetic disk device (HDD) according to this embodiment.

FIG. 11 is a view schematically showing an example of permission/prohibition of recording/reproduction of data in each sector in a plurality of tracks of the magnetic disk 12. Recording/reproduction of data can be carried out on/from a sector in which recording/reproduction of data is permitted and, recording/reproduction of data cannot be carried out on/from a sector in which recording/reproduction of data is prohibited. The magnetic disk 12 according to the example shown in FIG. 11 includes m+1 tracks assigned with track numbers from 0 to m. The track numbers are assigned in such a manner that the track present at the flyability-assured area outermost circumference X92 is assigned with 0, then assignment is carried out in ascending order from the aforementioned track to the inside in the off-track direction and, the track present at the flyability-assured area innermost circumference X91 is assigned with m. Each of these tracks includes n+1 sectors assigned with sector numbers from 0 to n. The numbers m and n are arbitrary natural numbers and may be different from each other or may be identical to each other.

In the example shown in FIG. 11, in the sector 4 and sector 5 of the track 0, and in the sector 4 and sector 5 of the track 1, holder-affected parts 80 are present. Accordingly, these four sectors are prohibited from undergoing recording/reproduction of data on/from them. In FIG. 11, these prohibited sectors are indicated by shading. Conversely, sectors of the track 0 other than the sectors 4 and 5, and sectors of the track 1 other than the sectors 4 and 5 are permitted to undergo recording/reproduction on/from them. In addition, all the sectors from the sector 1 to sector n included in each of the tracks from the track 2 to track m are permitted to undergo recording/reproduction on/from them. That is, all the sectors of all the tracks positioned on the inner side of the track 1 in the off-track direction are permitted to undergo recording/reproduction of data on/from them. In FIG. 11, these permitted sectors are indicated in white.

Aforementioned data recording/reproduction permission/prohibition for each sector in each of the plurality of tracks is administrated by means of, for example, a table (hereinafter referred to as a recording/reproduction permission/prohibition table) in which values of predetermined flags (hereinafter referred to as recording/reproduction flags) are set. As an example, in each of sectors permitted to undergo recording/reproduction, 0 is assigned to the value of the recording/reproduction flag thereof and, in each of sectors prohibited to undergo recording/reproduction, 1 is assigned to the value of the recording/reproduction flag thereof, whereby it is made possible to uniquely sort the sectors of the both types. Further, the values of these recording/reproduction flags are recorded in the recording/reproduction permission/prohibition table for each of the sectors of all the tracks of the magnetic disk 12 of the HDD 10, thereby tabulating the values of the flags.

The recording/reproduction permission/prohibition table is prepared by the data area administrator 46c of the MPU 46 in, for example, the quality inspection to be carried out before shipment of the product (HDD 10), and is stored in the nonvolatile memory of the memory 47 of the main controller 40. Then, the data area administrator 46c carries out processing (hereinafter referred to as LBA assignment processing) of assigning logical addresses to the sectors of the magnetic disk 12. The LBA assignment processing is the processing of assigning logical addresses to the magnetic disk 12 according to the recording/reproduction permission/prohibition table, i.e., according to presence/absence of the holder-affected part 80 of the magnetic disk 12. In the LBA assignment processing, the data area administrator 46c appropriately assigns the logical addresses to the aforementioned sectors according to the values of the recording/reproduction flags of the sectors recorded in the recording/reproduction permission/prohibition table.

For example, to a sector the value of the recording/reproduction flag of which is set to 0 and which is permitted to undergo recording/reproduction of data, a logical address is assigned. Conversely, to a sector the value of the recording/reproduction flag of which is set to 1 and which is prohibited to undergo recording/reproduction of data, no logical address is assigned. Thereby, a sector in which a holder-affected part 80 is absent is assigned with a logical address and is used as the data area 110 of the magnetic disk 12. Conversely, a sector in which a holder-affected part 80 is present is assigned with no logical address and is excluded from the data area 110 of the magnetic disk 12.

As described above, according to the HDD 10 according to this embodiment, even in the case where a holder-affected part 80 is present in the magnetic disk 12, it is possible to restrict the off-track vibration of the slider 15 of the magnetic head 16 ascribable to the aforementioned holder-affected part 80 to a value less than or equal to the permissible off-track vibration amplitude Y81. At this time, it is possible to appropriately presume the maximum amplitude of the off-track vibration of the low temperature (about 5° C.) in the state where the atmospheric temperature of the HDD 10 is the ordinary temperature (about 30° C.) on the basis of the temperature characteristics of the maximum amplitude of the off-track vibration as shown in FIG. 8.

Accordingly, even in the case where confirmation of the temperature characteristics of the maximum amplitude of the off-track vibration is carried out at an ordinary temperature (about 30° C.) or at a high temperature (about 60° C.) at the time of, for example, shipment of the HDD 10, and confirmation of the temperature characteristics of the low temperature (about 5° C.) is not carried out from the viewpoint of manufacturing efficiency, it is possible to appropriately presume the maximum amplitude of the off-track vibration at the low temperature time, and restrict the off-track vibration to a value less than or equal to the permissible off-track vibration amplitude Y81.

Further, according to a relationship between the radial position of the magnetic disk 12 and off-track vibration in the HDD 10 as shown in FIG. 9, it is possible to set the outer edge 110a of the data area 110 according to the temperature characteristics of the maximum amplitude of the off-track vibration.

The aforementioned outer edge 110a is set according to the off-track vibration ascribable to the holder-affected part 80 of the magnetic disk 12. Accordingly, whereas the part of the data area 110 corresponding to the holder-affected part 80 is set further inside (second outer edge 122) the flyability-assured area outermost circumference X92, the part of the data area 110 other than the holder-affected part 80 can be extended to the flyability-assured area outermost circumference X92 (first outer edge 121). Thereby, even in the case where the holder-affected part 80 is present in the magnetic disk 12, it is possible to extend the data area 110 in which recording/reproduction of data is enabled to the utmost extent possible.

Therefore, according to this embodiment, it is possible to appropriately restrict the maximum amplitude of the off-track vibration to a value within the permissible off-track vibration amplitude Y81 even at the low temperature time and extend the data area 110 to the utmost extent possible. As a result, it becomes possible to set the data area 110 in consideration of the variation in the amplitude of the off-track vibration relative to the variation in the atmospheric temperature of the HDD 10 and improve the recording density and reliability of the HDD 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk including a data area on/from which data can be recorded/reproduced; and
a magnetic head which records data on the data area and reproduces data from the data area, wherein
an outer edge of the data area includes first outer edge, second outer edge positioned on the further inner circumferential side of the magnetic disk relatively to the first outer edge, and third outer edges each connecting between the first outer edge and the second outer edge, and incudes concave parts made inwardly concave toward the inner circumferential side of the magnetic disk at not less than part thereof.

2. The magnetic disk device of claim 1, wherein
the magnetic disk includes a substrate, and a magnetic recording layer provided on each surface of the substrate, and
a film thickness of the magnetic recording layer of the concave part differs from a film thickness of the magnetic recording layer of the data area.

3. The magnetic disk device of claim 2, wherein
the concave parts are each arranged in a circumferential direction of the magnetic disk so as to correspond to positions at which the substrate is held by holders at the time of film formation of the magnetic recording layer.

4. The magnetic disk device of claim 3, wherein
the first outer edge and the second outer edge are each set to such radial positions of the magnetic disk that the maximum amplitude of an off-track vibration in a radial direction of the magnetic disk occurring on the magnetic head at the time of recording or reproduction of data on or from the magnetic disk becomes less than or equal to a predetermined threshold.

5. The magnetic disk device of claim 4, wherein
the first outer edge is set to an outermost circumferential radial position of an area in which the magnetic head can be flied relatively to a surface of the magnetic disk.

6. The magnetic disk device of claim 5, wherein
as the maximum amplitude of the off-track vibration of the magnetic head, a permissible value at a predetermined low temperature lower than the ordinary temperature are assumed the basis of values from a detection value at the time when an atmospheric temperature of the magnetic disk device is the ordinary temperature.

* * * * *